United States Patent
Natho et al.

[11] 3,729,168
[45] Apr. 24, 1973

[54] PISTON STOP FOR PISTON OPERATED VALVE

[75] Inventors: Paul J. Natho, Houston; Felix J. Vicari, Longview, both of Tex.

[73] Assignee: ACF Industries, Incorporated, New York, N.Y.

[22] Filed: Aug. 13, 1971

[21] Appl. No.: 171,606

[52] U.S. Cl. .................. 251/60, 251/63.6, 92/13
[51] Int. Cl. .................. F16k 31/143, F15b 15/24
[58] Field of Search .................. 251/63.5, 63.6, 60, 251/62, 327; 92/13.6, 13.8, 13.5, 13

[56] References Cited
UNITED STATES PATENTS

| | | | |
|---|---|---|---|
| 3,175,473 | 3/1965 | Boteler et al. | 92/13.8 X |
| 3,244,399 | 5/1966 | Jones et al. | 251/327 |
| 2,918,040 | 12/1959 | Lieser | 92/13 |
| 2,974,677 | 3/1961 | Natho | 251/327 X |
| 951,513 | 3/1910 | Rohrbacher | 92/13 |
| 1,097,681 | 5/1914 | Shaughnessy | 92/13.8 X |
| 3,466,001 | 9/1969 | Nelson | 251/63.6 X |

Primary Examiner—Arnold Rosenthal
Attorney—Eugene N. Riddle

[57] ABSTRACT

A gate valve structure has a stem extending outwardly of the valve housing and a valve operator for actuating the gate valve. The valve operator includes a fluid cylinder and a piston secured to the stem and mounted within the cylinder for reciprocable movement between open and closed positions of the gate valve. A generally cylindrical piston stop has external screw threads mating with internal screw threads on the cylinder and is accessible from a position outside the cylinder so that the piston stop may be adjusted without any disassembly of parts.

3 Claims, 5 Drawing Figures

Patented April 24, 1973

INVENTORS.
PAUL J. NATHO
FELIX J. VICARI
BY

Eugene N. Riddle

ATTORNEY

PISTON STOP FOR PISTON OPERATED VALVE

BACKGROUND OF THE INVENTION

In a fluid operator for a reciprocable type gate valve, it is desirable to have an adjustable stop for the piston in order for the port in the gate valve to align properly with the fluid flow passage when the piston contacts the stop. When a valve operator embodying a fluid cylinder is employed, alignment may be obtained by a stop for the piston which is adjustable to maintain the alignment of the gate valve with the bore.

Adjustable stops have been employed heretofore for pistons in cylinders forming a fluid operator. In some instances, a plurality of adjusting screws have been employed to contact the piston in the open position of the gate valve and this has resulted at times in a tilting or canting of the piston. Further, many of the adjustable stops have not been accessible from a position outside the cylinder and have required at least a removal or partial disassembly of parts before any adjustment could be made.

BRIEF DESCRIPTION OF THE INVENTION

The piston stop in the valve operator comprising the present invention is generally cylindrical and contacts the piston about its entire circumference which minimizes any tilting or canting of the piston. Further, the piston stop has external screw threads which engage internal screw threads in the cylinder or housing which permit the stop to be easily adjusted relative to the piston. An opening in the wall of the housing or cylinder permits a manual tool, such as a screwdriver, to be inserted for engaging notches or indentations in the piston stop for rotation of the stop to the desired adjustment. A set screw is provided to hold the piston stop in position after the piston stop has been adjusted. The invention is particularly adapted for use with reverse acting or reverse ported gate valves in which the gate valve is open upon the piston contacting the stop.

The invention accordingly comprises the constructions hereinafter described, the scope of the invention being indicated in the following claims.

In the accompanying drawings, in which two of various possible embodiments of the invention are illustrated, FIG. 1 is a sectional view of a gate valve structure and a pneumatic cylinder operator for the gate valve employing the piston stop comprising the present invention;

Figure 1:
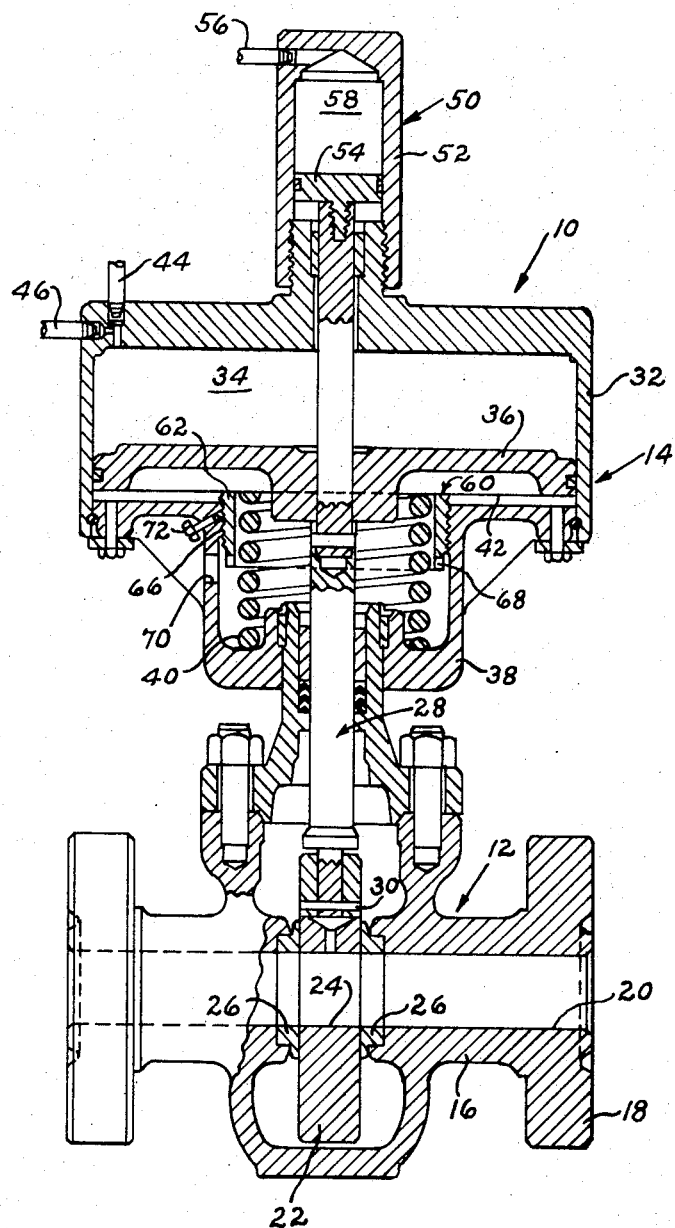
Figure 4:
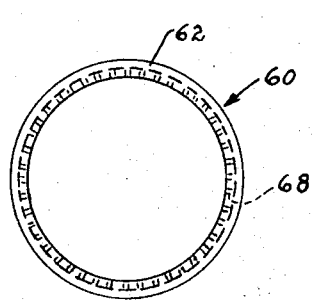
FIG. 4 is a top plan of the piston stop shown in FIG. 3.
Figure 3:
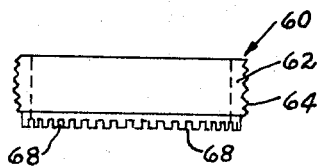
FIG. 3 is a side elevational view of the piston stop removed from the valve operator shown in FIGS. 1 and 2.

Referring now to the drawings and more particularly to the embodiment shown in FIGS. 1-4 employing a pneumatic operator, gate valve structure 10 includes a lower gate valve generally indicated 12 and an upper pneumatic piston operator generally indicated 14. Gate valve 12 includes a valve body or housing 16 having flanged ends 18 and a central bore 20 forming a fluid flow passage. A gate valve member 22 has a port 24 therein adapted for alignment with bore 20 in the open position of valve member 22 as shown in FIG. 1. Valve seats 26 on valve body 16 provide a tight sealing relationship between valve member 22 and seats 26. A valve stem generally indicated 28 is pivotally connected at 30 adjacent its lower end to gate valve member 22.

Figure 2:
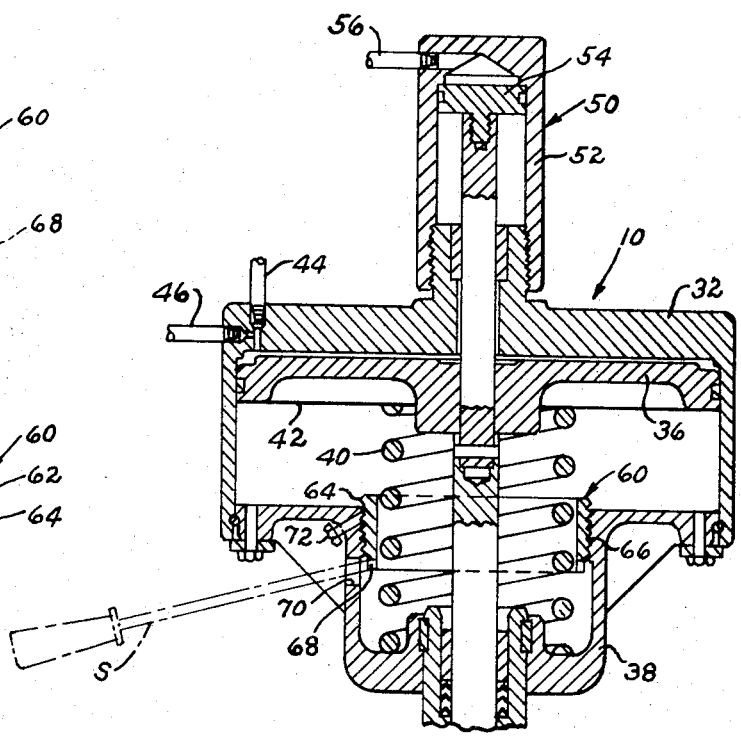
FIG. 2 is a section of the pneumatic operator shown in FIG. 1 indicating the piston in its outer position with the gate valve in a closed position.

Valve operator 14 includes a pneumatic cylinder 32 having a fluid chamber 34 therein. A piston 36 is secured to stem 28 and a lower housing 38 receives a coil spring 40 therein which contacts the lower surface 42 of piston 36 for urging piston 36 and gate valve member 22 toward a closed position of gate valve 22 with piston 36 in its outer position as shown in FIG. 2. Suitable air lines may be connected to inlet nipple 44 and outlet nipple 46 for the control of piston 36.

In the event piston 36 is in the position shown in FIG. 2 with valve member 22 closed and a failure occurs in the air line to cylinder 32, such as a rupture or break in the air line, gate valve member 22 may be moved to an open position by a hydraulic override generally indicated 50. Fluid cylinder 52 receives piston 54 secured to the upper end of stem 28. Fluid may be inserted through nipple 56 within fluid chamber 58 for movement of piston 54 to the position shown in FIG. 1 thereby opening valve member 22.

Forming an important part of this invention is the piston stop generally indicated 60. Piston stop 60 has a generally cylindrical body 62 with external screw threads 64 about the outer circumference of body 62. Internal screw threads 66 on the inner wall of housing 38 mate with screw threads 62. Serrations or notches 68 are provided along a lower marginal portion of body 62. An opening 70 in the wall of valve housing 38 permits access to piston stop 60 for adjustment relative to piston 36. A screwdriver or the like shown in broken lines at S in FIG. 2 may be inserted within opening 70 and engage a notch 68 in piston stop 60. By exerting a leverage with screwdriver S, stop 60 may be rotated for raising or lowering the piston stop. A set screw 72 is provided to hold or secure piston stop 60 in position after the piston stop has been adjusted to its desired position.

The entire outer or upper peripheral surface of piston stop 60 may act as a stop for piston 36 and eliminates any tendency of piston 36 to cant. Piston stop 60 may be easily adjusted relative to piston 36 from a position outside the valve housing without any disassembly or removal of parts.

Figure 5:
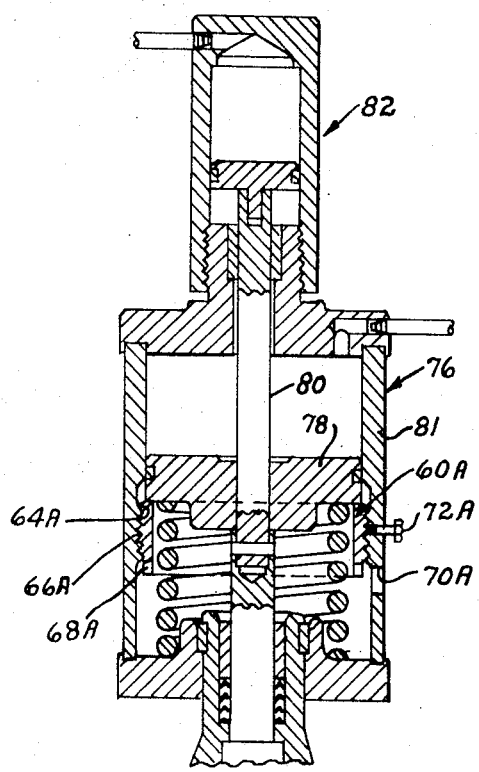
FIG. 5 is a partial sectional view of a hydraulic fluid operator for a gate valve and showing a hydraulic fluid pressure override with a piston stop comprising the present invention mounted within the hydraulic fluid cylinder.

Referring to FIG. 5, another embodiment is shown in which a hydraulic fluid operator 76 is shown having a piston 78 secured to a valve stem 80 within cylinder 81. A hydraulic type override 82 is provided for the hydraulic fluid operator 76 in a manner similar to that of the embodiment shown in FIGS. 1-4. Piston stop 60A has external screw threads 64A which engage internal crew threads 66A on the interior surface of fluid cylinder 81. Notches 68A are provided along the inner or lower surface of stop 60A. An opening 70A in the wall of housing 81 provides access for the adjustment of piston stop 60A in a manner similar to that of the piston stop shown in FIGS. 1–4. A set screw 72A secures piston stop 60A in position after stop 60A has been adjusted vertically to its desired position.

We claim:

1. In a valve operator for a gate valve having a reciprocating stem and movable between open and closed positions, a housing having the stem extending concentrically therethrough, a piston secured to the stem and mounted within the housing for reciprocable movement, and a generally cylindrical piston stop mounted within the housing inwardly of the piston and contacting an inner surface of the piston upon the piston reaching its inner position in the open position of the gate valve, said piston stop having external screw threads mating with internal screw threads on the housing for adjustable movement in a longitudinal position relative to the piston, said housing having an opening in the wall thereof adjacent the piston stop to permit access to the piston stop from a position outside the housing, said piston stop having indentations therein adapted to be engaged by a manual tool for adjusting the stop.

2. In a valve operator for a gate valve as set forth in claim 1, a coil spring about the stem and contacting an inner surface of the piston for urging the piston to its outer position, said cylindrical piston stop receiving said coil spring.

3. A gate valve structure comprising a main valve body having an axial fluid flow passage, a gate valve member in the valve body having a port therein adapted to align with the flow passage in an open position and to close the flow passage in a closed position, a stem attached to said valve member and extending outwardly of the main body, a hydraulic cylinder including a relatively large diameter housing and a relatively small diameter housing receiving the stem, a piston secured to the stem and mounted within the relatively large diameter housing for reciprocable movement between inner and outer positions, and a generally cylindrical piston stop mounted within the relatively small diameter housing inwardly of the piston and contacting an inner surface of the piston upon the piston reaching its inner position in the open position of the gate valve member, said relatively small diameter housing having an opening in the wall thereof adjacent the piston stop to permit access to the piston stop from a position outside the small diameter housing, said piston stop having external screw threads mating with internal screw threads on the cylinder for adjustable movement in a longitudinal position relative to the piston.

* * * * *